United States Patent [19]

Sekiya et al.

[11] 3,744,274

[45] July 10, 1973

[54] DEVICE FOR CONNECTING POWER TRANSMISSION MEMBER OF DRIVE SHAFT

[75] Inventors: Setsuro Sekiya, Toyota; Motonobu Ando, Okazaki; Yoshihiro Nunotaki, Toyota; Shogo Kato, Toyota; Yoshiro Jikihara, Toyota, all of Japan

[73] Assignee: Toyota Jidosha Kogyo Kabushiki Kaisha, Toyota, Japan

[22] Filed: July 27, 1971

[21] Appl. No.: 166,343

[30] Foreign Application Priority Data

July 29, 1970 Japan.............................. 45/66012

[52] U.S. Cl................. 64/30 C, 64/27 F, 64/30 A
[51] Int. Cl............................................ F16d 11/23
[58] Field of Search.............. 64/30 R, 30 LB, 30 C, 64/30 A, 28 R, 27 F, 23; 192/107 M

[56] References Cited
UNITED STATES PATENTS

| | | | |
|---|---|---|---|
| 2,974,504 | 3/1961 | Johnson | 64/30 C |
| 3,177,998 | 4/1965 | Rossez | 192/107 M |
| 3,434,577 | 3/1969 | Mathison | 192/107 M |
| 2,760,800 | 8/1956 | Wehenan | 64/30 R |
| 3,648,483 | 3/1972 | Garcia | 64/30 R |

*Primary Examiner*—Charles J. Myhre
*Assistant Examiner*—Randall Heald
*Attorney*—Arthur G. Connolly, Richard M. Beck et al.

[57] ABSTRACT

The present invention relates to a frictional connection arrangement between a drive shaft and a prime mover connected to rotate the drive shaft. The frictional connection arrangement is characterized by a surface having a low coefficient of friction and prevents noise due to drive slippage which occurs when the torque on the drive shaft exceeds a predetermined amount.

3 Claims, 3 Drawing Figures

PATENTED JUL 10 1973   3,744,274
FIG. 1
FIG. 3
FIG. 2
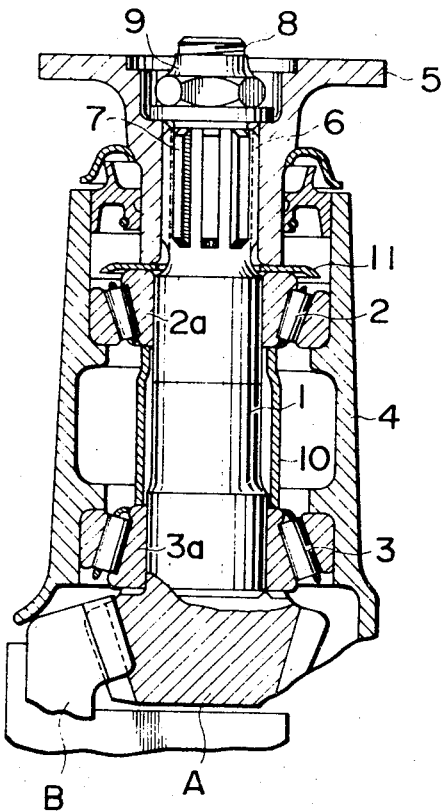
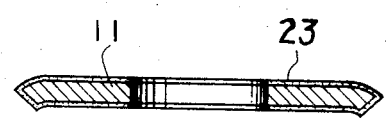
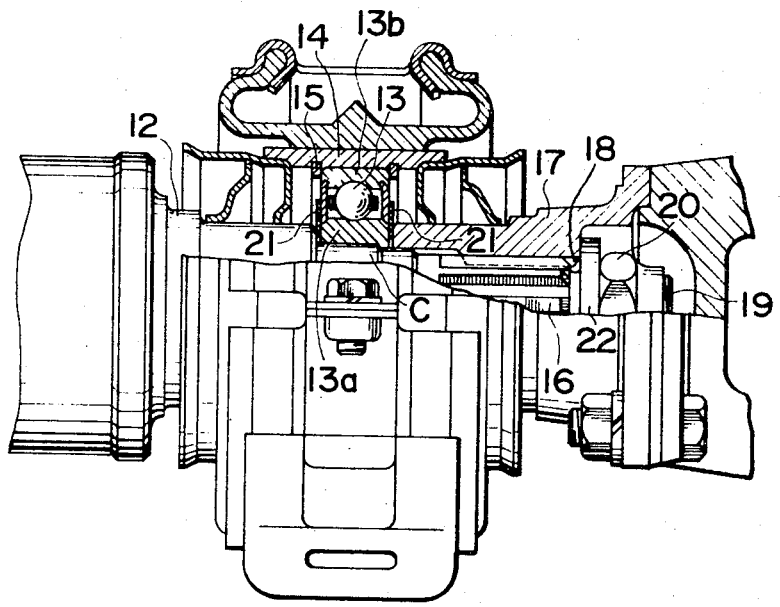

DEVICE FOR CONNECTING POWER TRANSMISSION MEMBER OF DRIVE SHAFT

The present invention relates to an arrangement for a power transmission including a drive shaft, and more particularly to a frictional connection arrangement which prevents noise due to a drive slippage when the torque on the drive shaft exceeds a predetermined amount.

The primary objective of the present invention is to provide a surface having a low coefficient of friction at selective locations in a frictional connection between a drive shaft and a prime mover that rotates the drive shaft whereby noise is prevented from being generated by drive slippage.

In accordance with the present invention a transmission comprises a first rotatable body with a second rotatable body in axial alignment therewith and connected thereto for rotatable movement therewith. A housing surrounds the second rotatable body, and bearings inside the housing rotatably support the second rotatable body. A device is provided for frictionally connecting the first rotatable body to the bearings so that initial rotation of the first body causes the bearings to rotate through frictional engagement to thereby assist in rotating the second body. The improvement comprises a surface having a low coefficient of friction in the frictional connection device located between the first rotatable body and the bearings. The strategic location of the surface of low coefficient of friction prevents noise due to slippage between the first rotatable body and the bearings which occurs when the torque on the second rotatable body exceeds a predetermined amount.

Preferably, the frictional connection device includes a washer between the first rotatable body and the bearings, the washer comprising porous sintered metal. Alternatively, the washer may include a coating of hardened synthetic resin, such as Teflon or nylon, for example.

Novel features and advantages of the present invention in addition to those mentioned above will become apparent from a reading of the following detailed description in conjunction with the accompanying drawing wherein:

FIG. 1 is a sectional view along the drive pinion shaft of the drive pinion shaft mount in a final reduction gear;

FIG. 2 is a sectional view along the propeller shaft of the center bearing component of a split-type propeller shaft; and FIG. 3 is a sectional view of a washer according to the present invention having a coating of antifriction material thereon.

Referring in more particularity to the drawing, FIG. 1 illustrates the drive pinion mount of the final reduction gear of an automobile. A drive pinion shaft 1 leading to the drive shaft of a prime mover is supported by a housing 4 via a pair of conical roller bearings 2, 3. The drive pinion A at the lower end of the shaft 1 meshes wity the final drive gear B, and the final drive shaft (wheel-axial) is rotated via the differential device attached to the final drive gear B.

The drive pinion A is integral with the drive pinion shaft 1 so that the shaft 1 includes a stepped portion which is the drive pinion A. Accordingly, in order to fit the drive pinion shaft 1 into the housing 4, the shaft 1 is inserted into the housing from its end opposite the drive pinion A. A companion flange 5 is fastened to the end of the pinion shaft 1 opposite the pinion A. The companion flange is connected to the drive shaft of a prime mover. For the purpose of connection, the companion flange 5 has inside splines 6 which mate with the outside splines 7 on the drive pinion shaft 1. The drive shaft 1 also includes a threaded terminal portion 8 which carries an internally threaded fastener 9. Tightening of the fastener 9 functions to reduce the axial displacement of the drive pinion shaft 1 under torque transmission by applying an adequate axial load (preliminary thrust) on the conical roller bearings 2, 3. Additionally, the fastener 9 serves to secure the companion flange 5 to the splined end of the shaft 1.

The tubular spacer 10 is located between the inner races 2a, 3a of the conical roller bearings 2, 3. Additionally, a washer 11 is located between the companion flange 5 and the conical roller bearing 2. Tightening of the fastener 9 operates to firmly connect the companion flange 5 (first rotatable body) and the drive pinion shaft 1 (second rotatable body).

Under normal assembly of the drive pinion shaft 1 and the companion flange 5, rotation of the companion flange connected to the drive shaft is transmitted via the spline connection between the flange and the shaft. Since the companion flange 5 and the drive pinion shaft 1 are firmly tightened together by the fastener 9, when the load on the drive pinion shaft is small the rotation of the companion flange 5 is transmitted to the shaft 1 under the frictional force of contact between the flange 5, the washer 11, the inner race 2a of the conical roller bearing 2, the spacer 10 and the inner race 3a of the conical roller bearing 3. These components are tightened together by the fastener 9. When the drive force transmitted to the companion flange increases to a degree that exceeds the contact frictional force between these components and finally reaches a predetermined torque, slippage occurs and immediately thereafter rotation of the companion flange 5 is solely transmitted to the shaft 1 via the spline connection 6, 7. In conventional arrangements fabricated of components having high frictional coefficients substantial elastic energy is accumulated in each component before actual slippage occurs. Accordingly, a sudden slip (stick slip phenomenon) on one part of the contact surface or on the entire contact surface between the parts produces a very strange noise sounding like "Kachin" or "Chirin". This noise has a psychologically undesirable effect on the driver of the automobile.

The above phenomenon also occurs in connection with the center bearing of a split-type propeller shaft. FIG. 2 illustrates such a center bearing including an input side 12, outer race 13b of a ball bearing fixed to the inside of a retainer 14 by a snap ring 15, and the inner race 13a supported at the component C of the shaft 12. The drive force from the prime mover is transmitted to the propeller shaft 12 via the prime mover, the disconnector, and the reduction gear. The shaft 12 has outside splines 16 which mesh with inside splines 18 on the companion flange 17 to thereby transmit the drive force to the shaft 12. A terminal threaded portion 19 is provided on the shaft 12, and a fastener 20 operates to secure the companion flange 17 to the shaft 12.

Torque transmission in the center bearing of FIG. 2 takes place by virtue of splined connection 16, 18 and the tightening frictional force of the fastener 20. Accordingly, when the torque from the prime mover is low, the tightened components rotate together as a unit along with the shaft 12. However, when the torque increases to the point where it overcomes the frictional resistance torque due to the tightening axial force, a sudden slippage occurs and the above noted noise is generated.

As explained above in conjunction with FIGS. 1 and 2, a strange noise is generated due to drive slippage which occurs when the torque on the drive shaft exceeds a predetermined amount. A large frictional resistance is developed between the tightened components whereby significant elastic energy accumulates between the components before slippage occurs. Accordingly, when the rotating torque exceeds a predetermined limit, the accumulated elastic energy is instantaneously released thereby causing a sudden slippage accompanied by a strange noise. Accordingly, if the elastic energy accumulation is prevented the generation of the accompanying noise will be prevented. The present invention involves direct transmission of the torque to the drive shaft with the frictional resistance between the components minimized.

Referring to FIG. 1, the components which are most apt to slip are the companion flange 5 and the inner race 2a of the conical roller bearing 2 both of which contact the washer 11. Thus, the desired objective of the present invention is obtained by fabricating the washer 11 of porous sintered metal with high oil impregnation effect. This enables the companion flange 5 to slide against the washer 11 when the torque on the drive shaft 1 exceeds a predetermined amount or when the shaft is otherwise twisted. Alternatively, instead of oil impregnation, the washer may be coated with a hardened synthetic resin having a low coefficient of friction such as nylon or Teflon, for example. FIG. 3 shows the washer 11 with an antifriction coating 23 thereon. Also, in accordance with the present invention, the point of low frictional coefficient in the arrangement can be either end of the spacer 10.

Referring to FIG. 2, the objective of the present invention is attained by providing a friction reducing resinous coating on any of the contact surfaces, such as both sides of the inner race 13a, both sides of the washers 21, 21 which function to hold the inner race 13a, both end faces of the companion flange 17 or both sides of the washer 22 located at the fastener 20.

What is claimed is:

1. In a transmission comprising a first rotatable body, a second rotatable body in axial alignment with the first body and interlockingly connected to the first body for rotatable movement therewith, a housing surrounding the second rotatable body, bearings inside the housing for freely rotatably supporting the second rotatable body within the housing, and means for frictionally connecting the first rotatable body to the bearings whereby initial rotation of the first body causes the bearings to rotate through frictional engagement to thereby rotate the second body, the improvement comprising a surface having a low coefficient of friction in the frictional connection means between the first rotatable body and the bearings.

2. The combination of claim 1 in which the frictional connection means includes a washer between the first rotatable body and the bearings, the washer comprising porous sintered metal.

3. The combination of claim 1 in which the frictional connection means includes a washer between the first rotatable body and the bearings, the washer including a coating of hardened synthetic resin.

* * * * *